No. 853,469. PATENTED MAY 14, 1907.
P. L. PASSAVANT.
AUTOMATIC LUBRICATING DEVICE.
APPLICATION FILED SEPT. 21, 1906.

2 SHEETS—SHEET 1.

WITNESSES:
INVENTOR
Philip L. Passavant
BY Finley Young
Attorneys

No. 853,469.  
PATENTED MAY 14, 1907.  
P. L. PASSAVANT.  
AUTOMATIC LUBRICATING DEVICE.  
APPLICATION FILED SEPT. 21, 1906.

2 SHEETS—SHEET 2.

WITNESSES:  
INVENTOR  
Philip L. Passavant  
BY Finley d Young  
Attorneys

UNITED STATES PATENT OFFICE.

PHILIP L. PASSAVANT, OF CONNELLSVILLE, PENNSYLVANIA, ASSIGNOR OF ONE-HALF TO FRANCIS M. COCKRELL AND THOMAS W. BAXTER, OF CONNELLSVILLE, PENNSYLVANIA.

AUTOMATIC LUBRICATING DEVICE.

No. 853,469.  Specification of Letters Patent.  Patented May 14, 1907.

Application filed September 21, 1906. Serial No. 335,545.

*To all whom it may concern:*

Be it known that I, PHILIP L. PASSAVANT, a citizen of the United States, residing at Connellsville, in the county of Fayette and State of Pennsylvania, have invented a new and useful Automatic Lubricating Device, of which the following is a specification.

My invention relates to grease-cups or lubricating devices in which the lubricating material, in the form of a semi-solid stick or cartridge, is automatically fed and applied to the journal box or bearing to be lubricated where it becomes liquefied by friction.

The object of my invention is to provide a device of this character whereby the lubricating cartridge or stick is automatically and continuously fed, under spring pressure, upon the journal box or bearing as the same may be worn off or exhausted by the action of the bearings.

Another object of my invention is to provide simple and efficient means for compressing the spring to permit the introduction of a fresh cartridge to renew the supply of lubricant material, and a further object thereof is to provide a more simple and effective mechanism to accomplish the above results which may be readily applied to journal boxes and bearings without affecting their usual construction and operation, and which will keep them thoroughly lubricated without any loss or waste of the lubricating material or possibility of running dry with the consequent heating of the parts, thus effecting a great economy in the use of the lubricant material, reducing wear on the journals by friction, and prolonging the period for which a charge of lubricant cartridge will supply the bearing without renewal.

To this end the invention includes the combination and arrangement of component parts to be hereinafter described and particularly pointed out in the claims.

Figure 1:
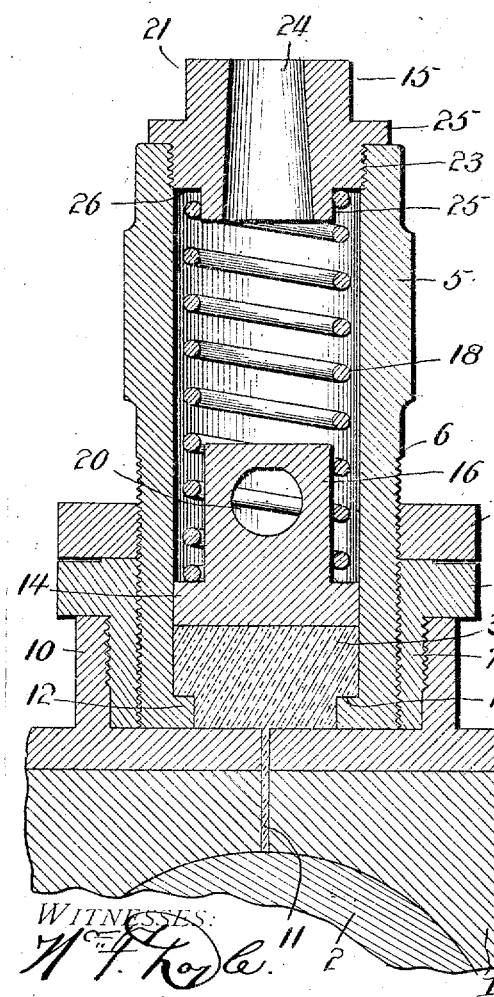
Figure 2:
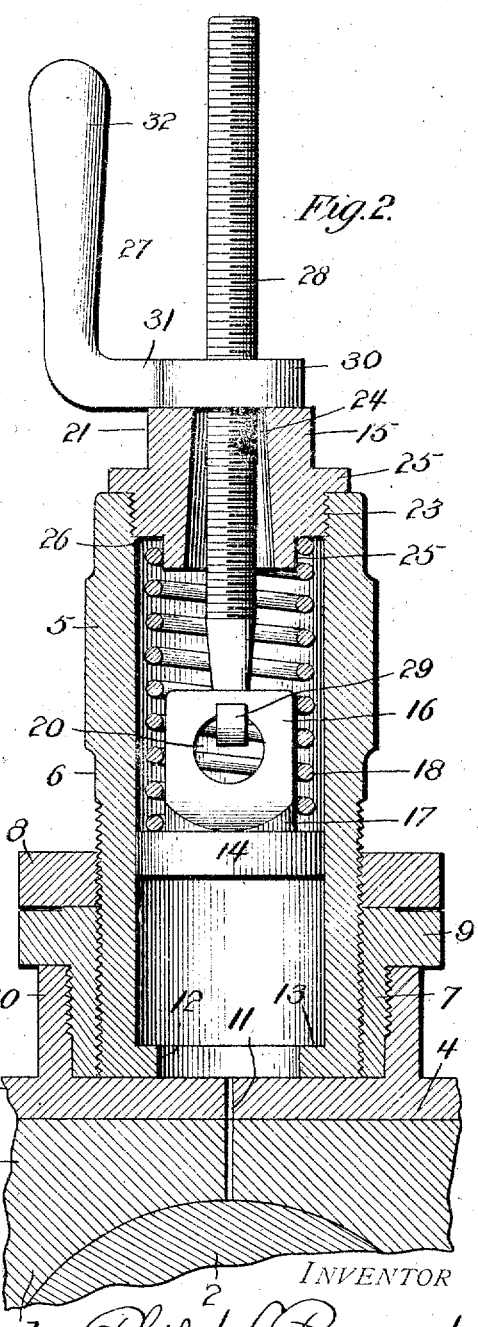
Figure 3:
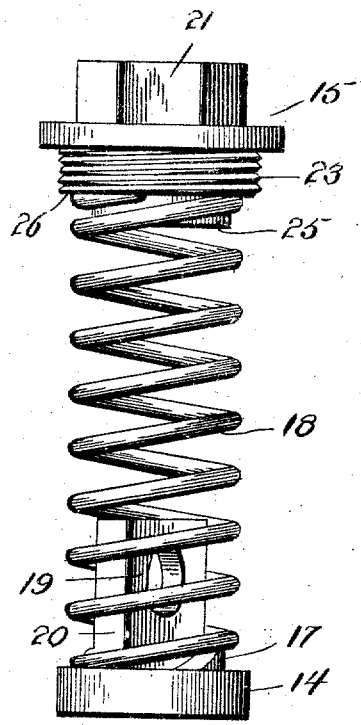
Figure 4:
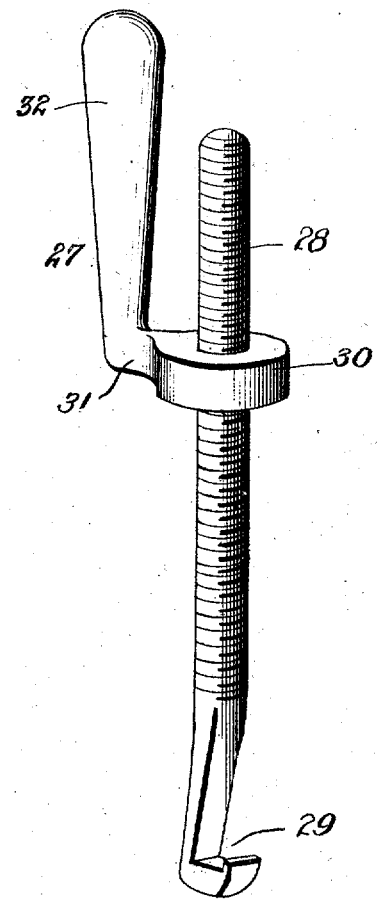

In the accompanying drawings, Figure 1 is a vertical sectional view of my lubricator attached to the crank end of a shaft showing the lubricator charged with a lubricating cartridge under spring pressure; Fig. 2 is a vertical sectional view showing the spring compressed to permit the introduction of the lubricant cartridge; Fig. 3 is a detail view of the cylinder cap, spring and plunger; and Fig. 4 is a perspective view of the key used for compressing the spring and plunger.

The invention includes generally a case, preferably of cylindrical form, adapted to contain the lubricant, provided with a suitable bushing and jam-nut, a plunger carried within the case, a coil spring interposed between the plunger and a suitable cap for the case, and bearing upon said plunger and cap, and a detachable stem for compressing the spring between the plunger and cap to permit the insertion of the charge of lubricant in the case.

Referring to the drawings, 1 designates a moving journal box used for connecting rods in which 2 indicates the crank pin, 3 the brasses and 4 the strap whereby the brasses are confined and secured to the driving shaft.

5 designates the lubricant case, which, as shown, is preferably of cylindrical form, having its lower exterior screw-threaded at 6 to receive the bushing 7 and jam-nut 8. Said bushing is internally and externally threaded and is provided with the angular nut-head 9. As shown in the drawings, the bushing is screwed into an annular collar 10 on the strap 4, and the case 5 is screwed down into the bushing until its lower end is adjacent to or rests upon the strap. A lubricant channel 11 communicates through the journal box with the bore of the lubricant case 5 and the journal bearings or crank-pin 3. When the lubricant case and bushing are in the positions above described, they may be locked therein by tightening the jam-nut 8 upon the head of the bushing.

The inner wall of the cylindrical lubricant case 5 is provided, adjacent to its lower end, with an inwardly extending annular flange 12 which forms an annular shoulder 13 adapted to form a seat for the lubricant cartridge 33 and act as a choker for the lubricant when under pressure of the spring-actuated plunger 14, hereinafter described. Adjacent to its opposite end the bore of the lubricant case is screw-threaded to accommodate the cap 15.

The means provided in my invention for gradually and continuously feeding the lubricant from the case upon the bearings, comprise a plunger 14, which is preferably disk-shaped and formed to snugly fit within the bore of the lubricant case 5. The lower face of said plunger is adapted to bear upon the lubricant cartridge, and its upper face is provided with an annular head 16, of lesser diameter than the plunger, which head is surrounded by the annular shoulder 17 forming a bearing for the end of the coil spring 18. The head 16 of the plunger is provided with a lateral extension or ear 19, which is pierced transversely by the circular orifice 20, which as shown, is squared at its upper side to co-act with a hook hereinafter fully described.

The lubricant case 5 is closed by the cap 15, which also forms the top bearing for the coil spring 18. Said cap comprises the nut-head 21 on its upper face and the screw-threaded annular extension 23 which screws into the internal threads adjacent to the top of the cylindrical case 5. The cap is provided with a central bore 24 which is surrounded by the annular longitudinal flange 25 on the lower face of the cap, which forms the annular shoulder 26 adapted to form a bearing for the upper end of the coil spring 18, which is interposed between the plunger 14 and the cap 15.

From the accompanying drawings and the foregoing description, it will be apparent that the cylindrical case 5 is adapted to contain a lubricant cartridge 33 beneath the spring pressed plunger 14, as shown in Fig. 1 of the drawings, by the action of which the lubricant is gradually and automatically supplied to the journal bearings.

For the purpose of compressing the spring and plunger and holding same to permit the filling of the lubricant case, the plunger is provided with a detachable stem 27 comprising the screw-threaded shank 28 and the hooked end 29. The hooked end of the stem fits within the orifice 20 in the head of the plunger 14, and the screw-threaded shank projects through the bore 24 in the cap 15, and carries the crank-nut 30 on its outer end. Said nut is provided with the crank arm 31 and handle 32 for turning same.

In the operation of refilling the case with lubricant, the crank-nut is tightened, bearing against the top of the cap, by which action the plunger is drawn outwardly toward the cap and the coil spring compressed therebetween. The plunger and spring are thus locked to the cap as shown in Fig. 2 of the drawings, and the cap may be removed carrying with it the plunger and spring, and the lubricant cartridge may be inserted in the cylinder. The cap may then be replaced on the case and the plunger and spring released by unscrewing the crank-nut, thus releasing the pressure of the spring upon the lubricant charge, and the plunger stem may, if desired, be detached from the plunger and removed from the case.

Having thus described my invention, what I claim as new and desire to be secured by Letters Patent, is:—

1. An automatic lubricating device comprising a lubricant containing case, a spring actuated plunger within the case having a head on its upper side, and a detachable stem for the plunger, there being a non-threaded connection between said head and the stem, substantially as described.

2. An automatic lubricating device comprising a cylindrical case adapted to contain a lubricant cartridge, a perforated cap for said case, a spring-actuated plunger within the case provided with a transversely perforated head and a detachable stem fitting therein, substantially as described.

3. An automatic lubricating device comprising a cylindrical case, a removable perforated cap therefor, a spring-actuated plunger within the case provided with a transversely perforated head and a detachable screw-threaded stem adapted to engage the perforated head, substantially as described.

4. An automatic lubricating device comprising a lubricant-containing case, a perforated cap therefor, a spring-actuated plunger within the case provided with a transversely perforated head, a detachable screw-threaded stem adapted to engage the perforated head, and a nut carried on said stem, substantially as described.

5. In an automatic lubricating device, the combination with a lubricant-containing case, and a perforated cap therefor, of a spring-actuated plunger within the case provided with a transversely perforated head, a detachable screw-threaded stem having a hook at one end adapted to engage the perforated head of the plunger, and a crank-nut upon the opposite end, substantially as described.

In testimony whereof I have signed my name to this specification in the presence of two subscribing witnesses.

PHILIP L. PASSAVANT.

Witnesses:
P. S. NEWMYER,
J. M. OVERSTREET.